United States Patent
Beckerle et al.

(10) Patent No.: US 7,565,349 B2
(45) Date of Patent: Jul. 21, 2009

(54) METHOD FOR COMPUTING FREQUENCY DISTRIBUTION FOR MANY FIELDS IN ONE PASS IN PARALLEL

(75) Inventors: Michael James Beckerle, Needham, MA (US); Jerry Lee Callen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 11/271,047

(22) Filed: Nov. 10, 2005

(65) Prior Publication Data

US 2007/0106666 A1    May 10, 2007

(51) Int. Cl.
*G06F 7/00*    (2006.01)
*G06F 17/30*    (2006.01)
(52) U.S. Cl. ......................................................... 707/7
(58) Field of Classification Search ................. 707/102, 707/104.1, 3, 7
See application file for complete search history.

(56) References Cited

U.S. PATENT DOCUMENTS

| | | | |
|---|---|---|---|
| 5,206,947 A | | 4/1993 | Edem et al. |
| 5,852,826 A | * | 12/1998 | Graunke et al. ................. 707/7 |
| 5,918,231 A | * | 6/1999 | Yasumura ............... 707/103 R |
| 6,061,437 A | | 5/2000 | Yoon |
| 6,138,114 A | | 10/2000 | Horowitz |
| 6,381,605 B1 | | 4/2002 | Kothuri et al. |
| 6,505,198 B2 | | 1/2003 | Horowitz |
| 6,643,644 B1 | * | 11/2003 | Furusho ......................... 707/5 |
| 6,681,224 B2 | | 1/2004 | Namba |
| 7,386,536 B1 | * | 6/2008 | Ramesh et al. ................. 707/2 |
| 2003/0078924 A1 | * | 4/2003 | Liechty et al. ................. 707/7 |
| 2003/0212658 A1 | | 11/2003 | Ekhaus |

OTHER PUBLICATIONS

DataWarehousing Online.com, "BI Products", [online] date unlisted, pp. 1-3. [Retrieved on Feb. 10, 2006]. Retrieved from the Internet at URL: <http://www.datawarehousingonline.com/products_dw.asp?sub_category=Data+Mining>.

(Continued)

*Primary Examiner*—Tim T. Vo
*Assistant Examiner*—Jeremy D Engelskirchen
(74) *Attorney, Agent, or Firm*—Janaki K. Davda; Konrad Raynes & Victor LLP

(57) ABSTRACT

Provided are a techniques for determining a frequency distribution for a set of records. A count table of frequency distributions is built in memory for each field in the set of records, wherein each record of each count table includes a field identifier, a field value, and a count of a number of times the field value occurs in the set of records, and wherein the field identifier concatenated with the field value comprises a composite key value. It is determined that at least one count table of frequency distributions is approaching a maximum amount of memory allocated to that count table. The records of the at least one count table that is approaching the maximum amount of memory are sent for sorting and additional counting, wherein the records include composite key values.

7 Claims, 14 Drawing Sheets

OTHER PUBLICATIONS

PriceWaterhouseCoopers, "Harte Hanks Communications Inc. Item 1. Business and Item 2. Properties", [online] 1995, pp. 1-14. [Retrieved on Feb. 10, 2006]. Retrieved from the Internet at URL: <http://info.cba.ksu.edu/bloodgood/Mgmt%20595/10Ks/hhs/hhs95.htm>.

Harte-Hanks, "Customer Relationship Management CRM Solutions", [online] date unlisted, pp. 1-2. [Retrieved on Feb. 10, 2006]. Retrieved from the Internet at URL: <http://crm.harte-hanks.com/crm_services.htm>.

Harte-Hanks, "2005 Client Conference", conference schedule and registration.

* cited by examiner

```
fd_compute
Inputs:    1
Outputs:       2
Input 0 partitioning:    arbitrary
Input 0 schema: arbitrary
Output 0 pp:     clear
Output 0 schema:       record ( count: uint64;
     value: tagged (
        f_0: uint64;
        f_1: <field 1 type>
        f_2: <field 2 type>
        [...]
        )
     )
Output 1 pp:           clear
Output 1 schema:       record ( fieldNumber: uintn; // 8, 16 or 32, as
required
     fieldName: string;
     fieldType: string;
     instances: uint64;
     values: uint64;
     )
Options:     none
```

FIG. 3

```
fd_invert

External characteristics
Mode:    Parallel
Inputs:  1
Outputs: 1
Input 0 partitioning:   arbitrary
Input 0 schema:         arbitrary
Output 0 pp:            clear
Output 0 schema:        record ( hash: uint32;
     encodedValue: raw; )
Options: none
```

```
fd_precount
External characteristics
Mode:      Parallel
Inputs:    1
Outputs:   1
Input 0 partitioning: modulo on hash
Input 0 schema:   record ( hash: uint32;
       encodedValue: raw; )
Output 0 pp:       set
Output 0 schema:  record ( encodedValue: raw;
       count: uint16; )
Options:
-schema <schema>
This is the schema of the dataset attached to input 0 of the fd_invert operator.
-memory <nMB>
The amount of memory that each partition of the operator may use for the count tables, in
megabytes. If not specified, a default of 10MB is assumed.
```

FIG. 7

```
fd_postcount
External characteristics
Mode:    Parallel
Inputs:  1
Outputs: 2
Input 0 partitioning: same
Input 0 schema: record ( encodedValue: raw;
      count: uint16; )
Output 0 pp:        clear
Output 0 schema:    record ( count: uint64;
      value: tagged (
         f_0: uint64;
         f_1: <field 1 type>
         f_2: <field 2 type>
         [...]
         )
      )
Output 1 pp:        clear
Output 1 schema:   record ( fieldNumber: uintn; // 8, 16 or 32, as required
      instances: uint64;
      values:    uint64;
      )
Options:
-schema <schema>
This is the schema of the dataset attached to input 0 of the fd_invert operator.
```

FIG. 8

```
fd_summary
External characteristics
Mode:    Sequential
Inputs:  1
Outputs: 1
Input 0 collector:   any
Input 0 schema:    record ( fieldNumber: uintn; // 8, 16 or 32, as required
        instances: uint64;
        values:    uint64;
    )
Output 0 pp:         clear
Output 0 schema:   record ( fieldNumber: uintn; // 8, 16 or 32, as required
        fieldName: string;
        fieldType: string;
        instances: uint64;
        values:    uint64;
    )
Options:
-schema <schema>
This is the schema of the dataset attached to input 0 of the fd_invert operator.
```

```
Inputs: 1 or 2
Outputs: variable
Input 0 partitioning: arbitrary
Input 0 schema:     Frequency Distribution
Dataset:
record ( count: uint64;
        value: tagged (
            f_0: uint64;
            f_1: <field 1 type>
            f_2: <field 2 type>
            [...]
        )
)
Input 1 partitioning: entire
Input 1 schema:     Field Summary
Dataset:
record ( fieldNumber: uintn; // 8, 16 or 32, as required
        fieldName: string;
        fieldType: string;
        instances: uint64;
        values: uint64;
)
Output 0 to (N-1) pp:       clear
Output 0 to (N-1) schema:   record ( count: uint64;
        percent: sfloat; // optional
        value: <field type>;
)
Output N pp:        clear
Output N schema:    Frequency Distribution
Dataset:
record ( count: uint64;
        value: tagged (
            f_0: uint64;
            f_1: <field 1 type>
            [...]
        )
)
Options:
-fields <list of field identifiers>
The fields identifiers are the numbers of the fields whose frequency distributions are to be
extracted. The output datasets are produced in the order that the field identifiers are
specified to the -fields option.
-retain
The retain filed indicates that the input frequency distribution should be copied to the last
output dataset, but with field information for the extracted fields removed. Note that the
extracted fields still appear in the schema for the output dataset; just the data records for
those fields are removed.
Input dataset 1 (the field summary dataset) is optional; if it is attached, then the
percentage field is produced in the extracted frequency distributions.
```

FIG. 10

METHOD FOR COMPUTING FREQUENCY DISTRIBUTION FOR MANY FIELDS IN ONE PASS IN PARALLEL

BACKGROUND

1. Field

Embodiments of the invention relate to computing frequency distribution for many fields in one pass in parallel.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A RDBMS uses relational techniques for storing and retrieving data in a relational database. Relational databases are computerized information storage and retrieval systems. Relational databases are organized into tables that consist of rows and columns of data. The rows may be called tuples or records or rows. Columns may be called fields. A database typically has many tables, and each table typically has multiple records and multiple columns.

A common task in data exploration is to compute a "frequency distribution" for each field in a dataset (e.g., each column in a table). The frequency distribution for a given field is a two-column table (also referred to as a frequency distribution table), with each row of the two-column table consisting of a distinct field value in the dataset and a count of the number of occurrences of that field value. The frequency distribution can be used to answer a variety of questions about the field, such as: How many distinct field values are there for the field? Which occurs most frequently? Is there a distinct field value for every record in the dataset, which suggests that the field is a "key" field?

Table A is a frequency distribution table for the following list of colors, which are field values: Blue, Red, Red, Green, Blue, Red, Blue, Green, Red, Red, Red, Blue

TABLE A

| Color | Count |
|-------|-------|
| Red   | 6     |
| Green | 2     |
| Blue  | 4     |

There are many approaches to compute a frequency distribution, and many of these approaches fall into one of two categories: a "table in memory" approach or a "sort and count" approach. With the "table in memory" approach, a frequency distribution table is built by creating a frequency distribution table for a field with a row for each distinct field value, and the count of each field value is directly updated as that field value is encountered in the dataset. The "table in memory" approach builds the frequency distribution table in memory. With the "sort and count" approach, all of the field values are sorted, the number of occurrences of each field value is counted, and one row of the result table is created each time a new field value is encountered in the sorted stream. The "sort and count" approach uses extra disk storage to perform the sort and count.

The "table in memory" approach works well for fields with a relatively small number of distinct field values, in which case the frequency distribution table fits into available memory, and the "sort and count" approach works well for fields with a large number of values where the frequency distribution table exceeds the size of available memory. The number of distinct field values is often not known a priori, making the selection of one of these approaches difficult. The problem is further complicated when attempting to compute a frequency distribution for all of the fields in a record in a single pass, and when attempting to compute the frequency distributions using a parallel processor.

Thus, there is a need in the art for improved computation of frequency distribution.

SUMMARY OF EMBODIMENTS OF THE INVENTION

Provided are a method, computer program product, and system for determining a frequency distribution for a set of records. A count table of frequency distributions is built in memory for each field in the set of records, wherein each record of each count table includes a field identifier, a field value, and a count of a number of times the field value occurs in the set of records, and wherein the field identifier concatenated with the field value comprises a composite key value. It is determined that at least one count table of frequency distributions is approaching a maximum amount of memory allocated to that count table. The records of the at least one count table that is approaching the maximum amount of memory are sent for sorting and additional counting, wherein the records include composite key values.

BRIEF DESCRIPTION OF THE DRAWINGS

Referring now to the drawings in which like reference numbers represent corresponding parts throughout:

FIG. 3 illustrates an example compute operator in accordance with certain embodiments.

FIG. 6 illustrates an example invert operator in accordance with certain embodiments.

FIG. 7 illustrates an example precount operator in accordance with certain embodiments.

FIG. 8 illustrates an example postcount operator in accordance with certain embodiments.

FIG. 9 illustrates an example summary operator in accordance with certain embodiments.

FIG. 10 illustrates an example extract operator in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments compute a frequency distribution for all fields in each record of a dataset by "inverting" the structure of each record and generating a single composite key value for each field value. The composite key value is generated by concatenating a field identifier with a field value. The resulting stream of composite key values is then passed through a multi-stage pipeline. The first stage builds a frequency distribution for the composite key value stream by caching as many values as fit into memory. When the available memory is exhausted, the frequency distribution thus far is passed on to a subsequent stage that sorts the frequency distribution by composite key values. The output of the sort is then fed to a final counting stage that creates a final frequency distribution (i.e., a frequency distribution dataset) for each field. Additionally, embodiments enable generation of summary information of the final frequency distribution and extraction of selected fields from the final frequency distribution to create "subset" frequency distributions (i.e., these frequency distributions are each a subset of the final frequency distribution).

Figure 1:
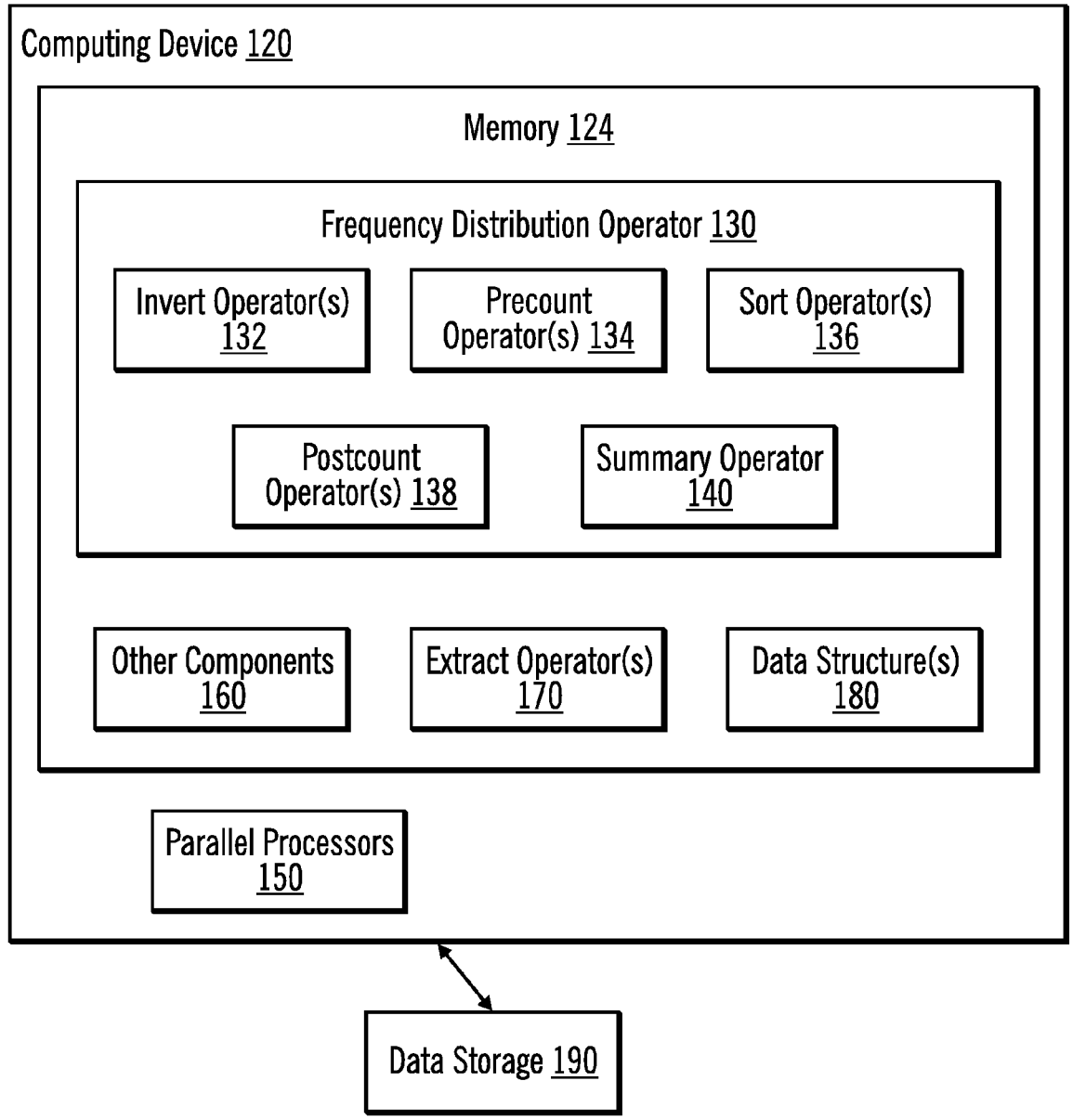
FIG. 1 illustrates details of a computing device in accordance with certain embodiments.

FIG. 1 illustrates details of a computing device 120 in accordance with certain embodiments. The computing device 120 includes system memory 124 and parallel processors 150, and may include one or more other components (not shown). The system memory 124 may be implemented in volatile and/or non-volatile devices. System memory 124 stores a frequency distribution operator 130. The frequency distribution operator 130 includes one or more invert operators 132, one or more precount operators 134, one or more sort operators 136, one or more postcount operators 138, and a summary operator 140. Memory 124 also includes one or more other components 160, one or more extract operators 170, and one or more data structures 180 (e.g., tables and files). The operators 130, 132, 134, 136, 138, 140, 170 may be executed by the parallel processors 150.

The operators 132, 134, 136, 138, 140 may be described as suboperators constituting the frequency distribution operator 130, which computes frequency distribution information for all of the fields in a dataset in a single pass, in parallel, with no guidance from a user regarding the number of values to expect for each field. The output of the frequency distribution operator 130 is a frequency distribution dataset and, optionally, a field summary dataset. The frequency distribution dataset provides frequency distribution information (i.e., provides a count of the number of occurrences of each value for each field), and this frequency distribution dataset may be several times larger in volume than the original input dataset. The field summary dataset is optional and is a small dataset that contains high level summary information for each field, including, for example, the field name and type, the number of instances of the field, and the number of distinct field values the field takes on. A field may occur a number of times in a dataset, and each occurrence may be described as an "instance". For example, in a dataset with the schema record (a:int32; b[]: date), there may be one instance of the "a" field for each record in the input, and there may be a variable number of instances of the "b" field for each input record because "b" is a variable length array.

In certain embodiments, the frequency distribution operator 130 and the extract operator 170 are externally-visible operators (i.e., operators that may be selected by a user for execution).

The one or more other components 160 may include generic functions, utility functions shared by two or more operators 132, 134, 136, 138, 140, and a driver (i.e., a composite operator) that combines the invert, precount, sort, postcount and summery operators 132, 134, 136, 138, 140.

The computing device 120 is coupled to data storage 190. The data storage 190 may comprise an array of storage devices, such as Direct Access Storage Devices (DASDs), Just a Bunch of Disks (JBOD), Redundant Array of Independent Disks (RAID), virtualization device, etc. The data storage 190 may store the output datasets.

FIG. 1 illustrates a Symmetric Multi-Processor (SMP) implementation of parallelism merely to provide an example to enhance understanding of embodiments. Embodiments may alternatively be implemented with a Multiple Parallel Processor (MPP) implementation of parallelism, in which multiple instances of computing device 120 are connected, for example, with a high-speed network.

Merely to enhance understanding, examples will be provided herein. It is to be understood that embodiments are not intended to be limited to these examples.

Figure 2:
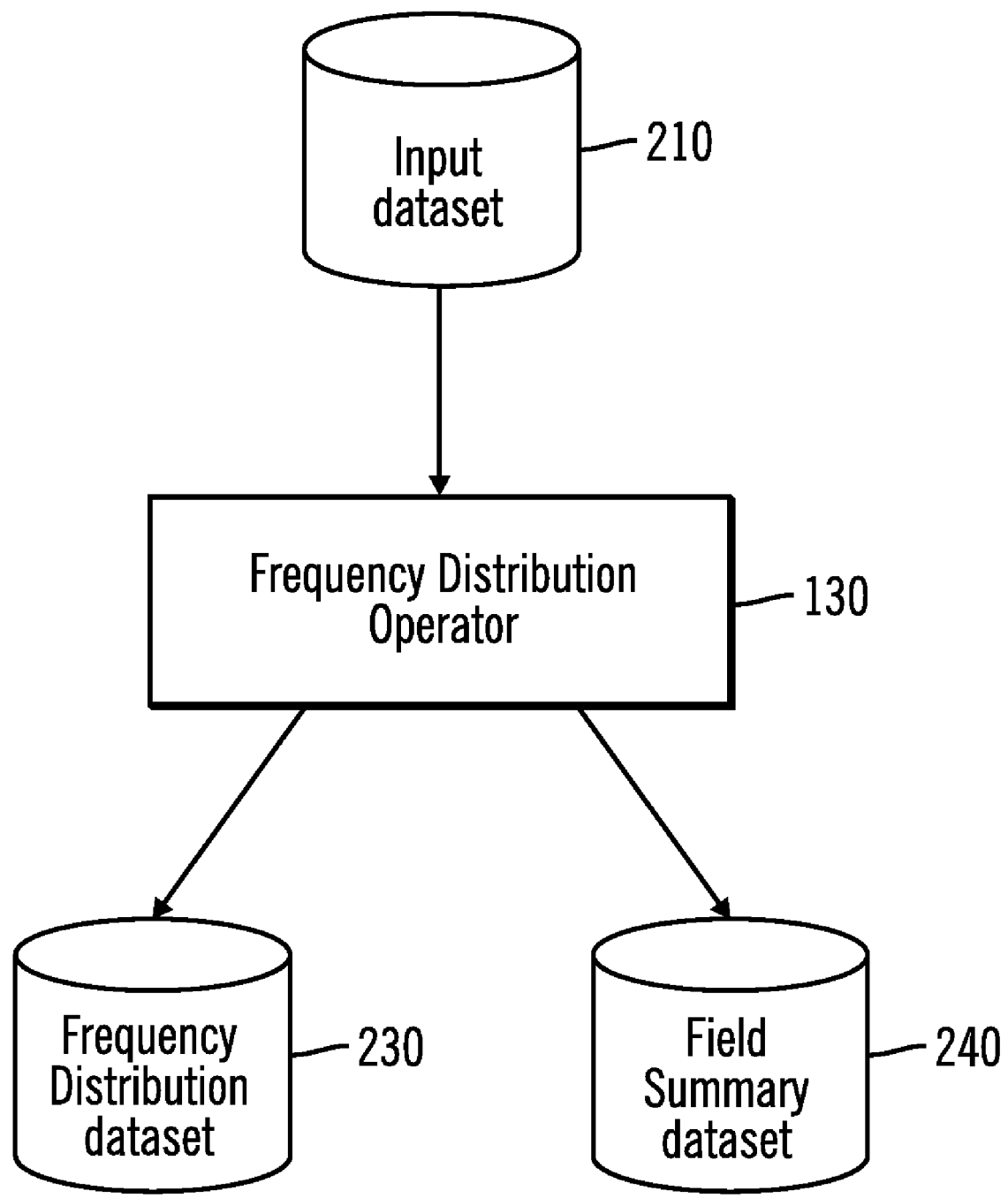
FIG. 2 illustrates a view of frequency distribution processing in accordance with certain embodiments.

FIG. 2 illustrates a view of frequency distribution processing in accordance with certain embodiments. The frequency distribution operator 130 takes an input dataset 210 (e.g., subrecords, vectors, and/or tagged subrecords) and produces two output datasets: the combined frequency distribution dataset 230 for all of the fields and a small field summary dataset 240.

FIG. 3 illustrates an example compute operator 300 in accordance with certain embodiments. The compute operator 300 is one example of the frequency distribution operator 130. In FIG. 3, "Input 0" describes an input dataset, "Output 0" describes a "frequency distribution dataset" whose schema is based on the schema of the input dataset, and "Output 1" describes a field summary dataset. In certain embodiments, any hierarchy in the input schema is "flattened", such that every field in the input schema becomes a field in a single tagged subrecord of the output schema.

The following Schemas A illustrates a structured input schema and a resulting output schema:

| Schemas A | |
|---|---|
| Input Schema | Output Schema |
| record ( | record ( |
|   a: int32; |   count: uint64; |
|   b: tagged ( |   value: tagged ( |
|     b1: |     f__0: uint64;    // for record count |
| string[10]; |     f__1: int32;    // field a |
|     b2: date; |     f__2: uint8;    // b's tag |
|   ); |     f__3: string[10];    // field b1 |
|   c[ ]: subrec ( |     f__4: date;    // field b2 |
|     c1: string; |     f__5: uint32;    // c's vector length |
|     c2[max=2]: |     f__6: string;    // field c1 |
|       decimal[3,2]; |     f__7: uint8;    // c2's vector length |
|   ); |     f__8: decimal[3,2];    // field c2 |
| ) |   ); |
| | ) |

Figure 4:
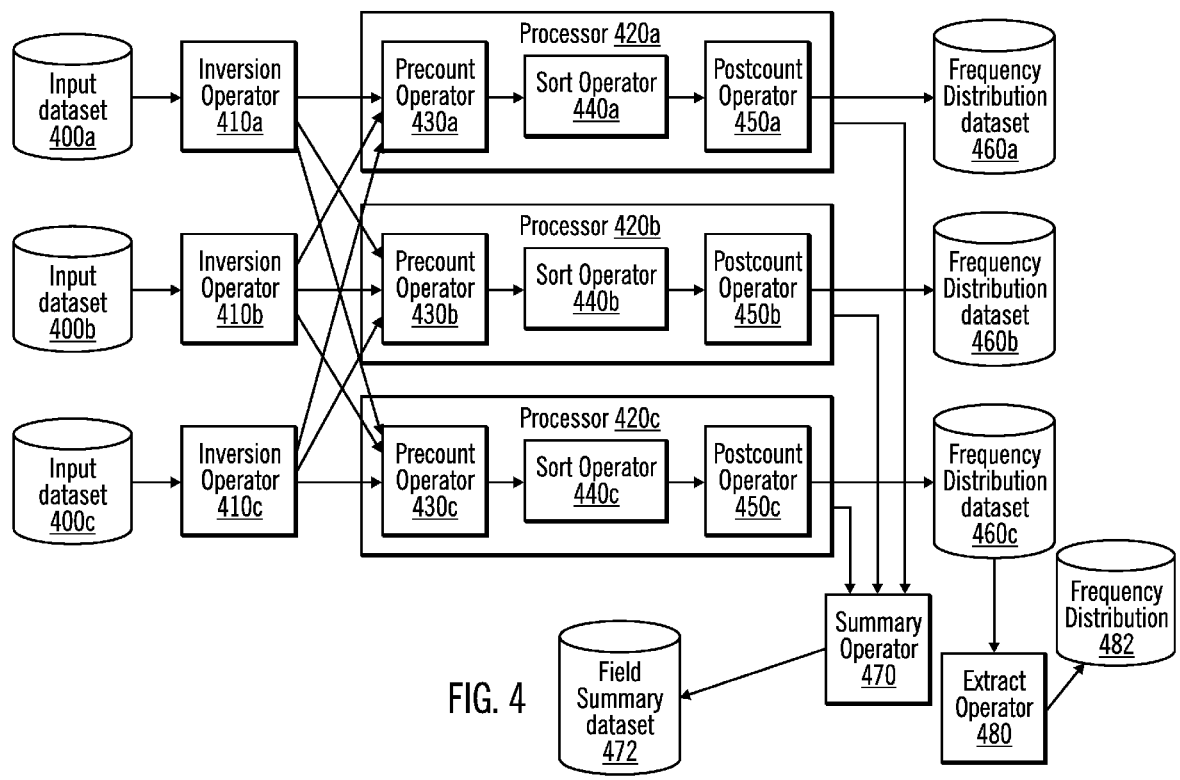
FIG. 4 illustrates a flow of processing in accordance with certain embodiments.

FIG. 4 illustrates a flow of processing in accordance with certain embodiments. There may be multiple instances of the inversion operator, precount operator, summary operator, and the postcount operator. That is, a given operator may have multiple instances, each of which processes a partition of data (where the data is partitioned using, for example, a hash function). It may also be said that an operator's processing may be partitioned across multiple processors.

One or more inversion operators 410a, 410b, 410c partition the incoming records from input datasets 400a, 400b, 400c, respectively, by generating composite key values and generating hash values from the composite key values that are used for the partitioning. The inversion operator 410 passes each composite key value to a particular precount operator 430a, 430b, 430c based on the partition for that composite key value. At each processor 420a, 420b, 420c, the precount operator 430a, 430b, 430c builds tables in memory for each field, and as the tables become full, each precount operator 430a, 430b, 430c passes the composite key values and counts to a corresponding sort operator 440a, 440b, 440c. Each sort operator 440a, 440b, 440b passes sorted composite key values and counts to a corresponding postcount operator 450a, 450b, 450c. Each of the postcount operators 450a, 450b, 450c generates a frequency distribution dataset 460a, 460b, 460c. In particular, each frequency distribution dataset 460a, 460b, 460c is a parallel result in that each instance of the postcount operator 450a, 450b, 450c produces a portion of the parallel result. In this manner, the invert, precount, sort, and postcount operators operate in parallel to produce a parallel frequency distribution dataset.

Additionally, the postcount operators 450a, 450b, 450c may optionally output data to a summary operator 470, which produces a field summary dataset 472. As another option, an extract operator 480 may generate a frequency distribution 482 for a field.

At each parallel processor, there are one or more precount operator instances. Then, there are as many sort and postcount operator instances as there are precount operator instances. Although the number of precount, sort, and postcount operator instances are identical, there may be any number of invert operator instances because the data is partitioned between the invert and precount operator instances. In various alternative embodiments, the inversion, precount, sort, and postcount operators may be on the same or different processors, in any combination (e.g., the invert and precount operators may be on one processor, while the sort and postcount operators may be on another processor).

In certain embodiments, the output of the precount operators 430a, 430b, 430c flows directly into the corresponding sort operators 440a, 440b, 440c, and the output of the sort operators 440a, 440b, 440c flows directly into the corresponding postcount operators 450a, 450b, 450c. In this manner, embodiments avoid writing intermediate datasets to data storage 190, and the intermediate datasets may be referred to as "virtual" datasets. In alternative embodiments, one or more intermediate datasets may be written to data storage 190 and used as input for the next operator in the pipeline.

Figure 5:
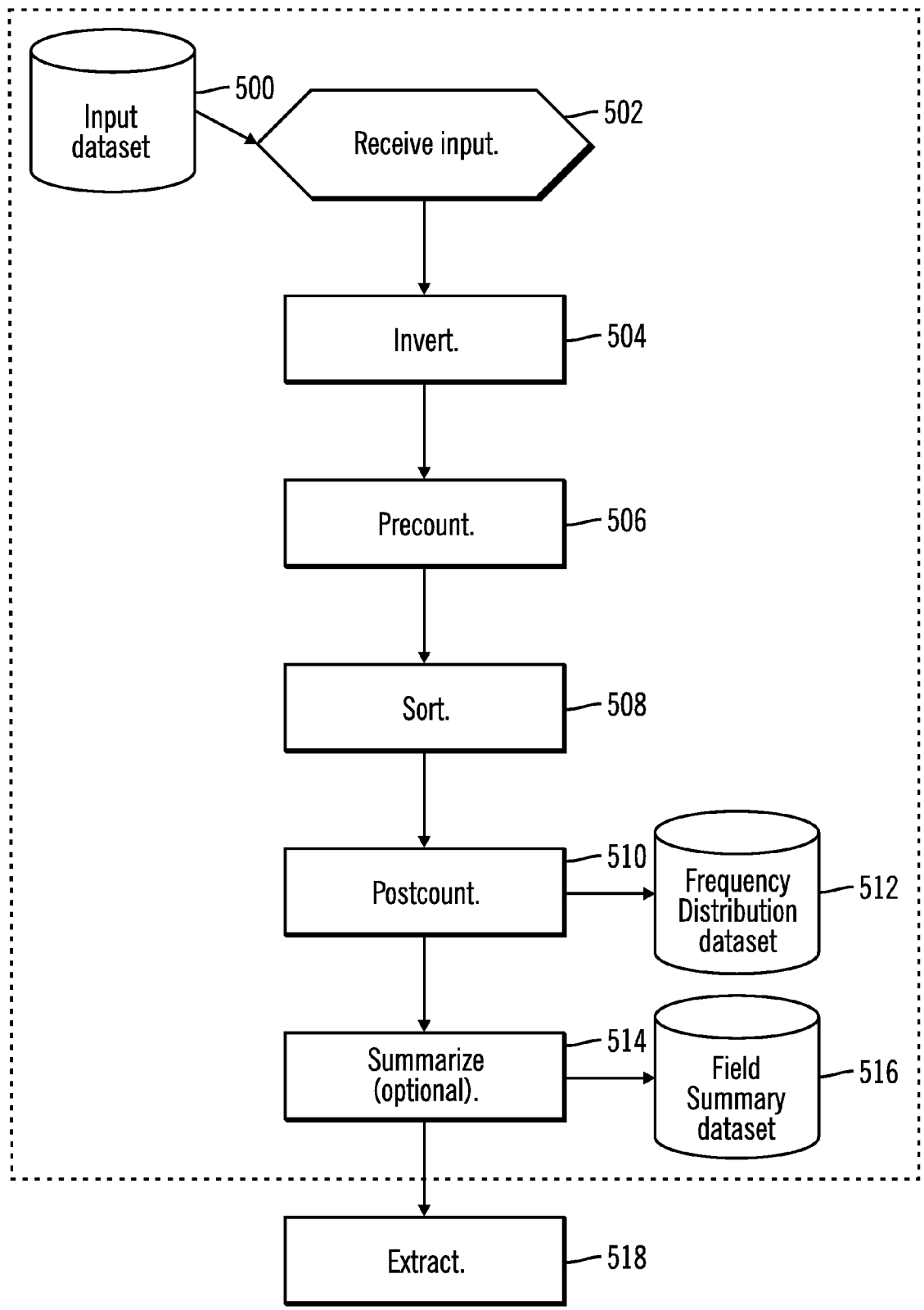
FIG. 5 illustrates logic for performing frequency distribution processing in accordance with certain embodiments.

FIG. 5 illustrates logic for performing frequency distribution processing in accordance with certain embodiments. The processing of the frequency distribution operator 130 may be described as including components 500-516.

In FIG. 5, processing begins at block 502, with one or more invert operators 132 receiving input from input dataset 500. In certain embodiments, the input to each invert operator 132 is a stream of records, which are received serially (i.e., one at a time). In block 504, each invert operator 132 inverts the input. Inverting the input may be described as converting a stream of records into a stream of individual field values, while tagging each field value with a field identifier in the record. For example, Table B illustrates an example an input record:

TABLE B

| | FIELD NAME | | | | | |
|---|---|---|---|---|---|---|
| | First Name | Last Name | Street Address | City | State | Zip |
| FIELD VALUE | John | Doe | 63 Winter Street | Blizzard | ND | 73873 |

Continuing with the example, the invert operator 132 takes the input record and outputs the following sequence of records, illustrated in Table C:

TABLE C

| FIELD IDENTIFIER | FIELD VALUE |
|---|---|
| 1 | John |
| 2 | Doe |
| 3 | 63 Winter Street |
| 4 | Blizzard |
| 5 | ND |
| 6 | 73873 |

The field identifier concatenated to the field value forms a composite key value (e.g., 1John or 2Doe). In certain embodiments, the field identifier and field value are in separate fields of a record, but are logically perceived to form the composite key value.

The invert processing includes partitioning the inverted records using the field identifier and field value as a composite key value. Each distinct combination of field identifier and value is in a same partition.

FIG. 6 illustrates an example invert operator 600 in accordance with certain embodiments. The invert operator 600 is one example of the invert operator 132. In FIG. 6, "Input 0" describes the input dataset, and "Output 0" describes the output of the invert operator 600. In particular, the invert operator 600 "inverts" the structure of each record in the input dataset, turning a stream of N records, each containing M fields, into a stream of N×M records, with each output record representing one field in one input record. The schema of the input record is arbitrary as various field types are supported, as are vectors and tagged subrecords. The term "arbitrary" may be described as indicating that a record may be any form (e.g., as subrecords, vectors or tagged subrecords).

The contents of the fields in the output record of the invert operator 600 include a hash value ("hash") and an encoded value ("encodedValue"). The hash may be a 32-bit unsigned hash for the field value that is computed by generating a hash on the encoded field value and then adding the field identifier. This allows the hash value for just the field value itself to be easily recovered (i.e., by subtracting the field identifier). The encodedValue is a "composite" field, containing two subvalues: the field identifier of the field in the record, stored in 1, 2, or 4 bytes, depending on the number of fields in the record, and the encoded value of the field. If the field value is null, just the field identifier may be present. Embodiments encode the field identifier and value to reduce the overall size of the data. This reduces the amount of data to be moved and sorted.

In order to provide a record count in the final summary, a special record is produced by the invert operator 600 after the last input record is processed and is used to provide a count of the input records to the summary operator. This record has these characteristics: hash: 0; field identifier: 0; and field Value: an unsigned 64-bit record count, stored little-endian.

In addition to the field values, records are generated for vector lengths and for tags of tagged subrecord values. The length of a vector precedes the values of the vector field instances. Similarly, the numeric tag value of a tagged subrecord precedes the value of the selected subfield.

The following Schema B is an example input schema:

---
Schema B record ( a: int32;
　　b: tagged (
　　　　b1: string[10];
　　　　b2: date;
　　);
　　c[ ]: subrec (
　　　　c1: string;
　　　　c2[max=2]: decimal[3,2];
　　);
)
---

The field identifiers and associated field values for the example input schema are illustrated in Table D:

TABLE D

| FIELD IDENTIFIER | FIELD VALUE |
|---|---|
| 1 | field a |
| 2 | field b tag (0 or 1) |
| 3 | field b1 |
| 4 | field b2 |
| 5 | field c vector length |
| 6 | field c1 value |
| 7 | field c2 vector length |
| 8 | field c2 value |

In certain embodiments, vector length values are not generated for fixed length vectors. The invert operator 600 has no options. The invert operator 600 may encode each field value type into a dense encoding to minimize the amount of data moved through the subsequent operators.

The field value type for tagged subrecords depends on the number of "arms" in the tagged subrecord may be described as representing one of a set of values at any given time and which of the values is represented is indicated by the tag's value, which is a small integer in the range zero to the total number of tag arms). The term "arms" may be described as types of the record, and a numeric value may be used to indicate which "arm" or type of a tagged subrecord is active. For example, the arm may be uint8, date, string, etc. Similarly, the field value type for vector lengths is determined by the maximum length of the vector. For example, a record may represent a person, and the record provides either the person's age (if still alive) or when the person died (if deceased). An example of a tagged subrecord for this follows:

---
age_or_death_date: tagged (
　　age: uint8;
　　death_date: date;
);
---

In certain embodiments, the size of the records flowing between the invert operator 132 and the precount operator 134 are small, and the records may be blocked by having a per-output-partition buffer and filling that buffer before sending the buffer. Such embodiments require that an upstream operator (e.g., the invert operator 132) knows the partitioning of its immediately downstream consumer (the precount operator 134) as records flow from an upstream operator to a downstream operator.

In certain embodiments, the invert operator 132 uses different encoding schemes for each field type: unsigned integer, sfloat/dfloat, string/ustring/raw, date, time, timestamp, and decimal. Although example encoding schemes are provided below, any encoding schemes may be used. The encoding schemes have corresponding decoding schemes, which are part of the postcount operator 138 processing.

For an unsigned integer (uint) field type, the encoding scheme stores a high-order byte as the first byte of the result (i.e., this is known as the leading byte), examines subsequent bytes from high-order to low-order and discards bytes that are the same as the leading byte; and, as soon as a byte is found that is not the same as the leading byte, stores that byte and all subsequent bytes. Example minimum and maximum encoded lengths for each integer type (in bytes) are illustrated in table E:

TABLE E

| Field Type | Minimum Bytes | Maximum Bytes |
|---|---|---|
| uint8 | 1 | 1 |
| uint16 | 1 | 2 |
| uint32 | 1 | 4 |
| uint64 | 1 | 8 |

For signed integers, the encoding scheme casts a value to the unsigned type of the same length and uses the encoding routine for the unsigned type. This encoding scheme favors integers with small absolute values.

For sfloat and dfloat (where the s in sfloat refers to single precision (32-bit) and the d in dfloat refers to double precision (64-bit) field types, the encoding scheme stores the value in big-endian order. Because floating point numbers are often normalized, it is likely that the low order bytes of the mantissa will be zero. In certain embodiments, the sign and exponent may be encoded as a fixed length prefix, followed by the non-zero bytes of the mantissa.

For string, unsigned string ("ustring"), and raw field types, which are variable length fields, the encoding scheme encodes them as a flag byte, followed by the leading, middle and trailing segments of the field. In certain embodiments, any or all of these segments may be absent, but the flag byte is always present. In certain embodiments, the flag byte is divided into three two-bit fields that specify the number of length bytes for each segment, where 00 indicates that the segment is absent, 01 indicates that the segment length is 1 byte (2-255 units), 10 indicates that the segment length is 2 bytes (256-65535 units), 11 indicates that the segment length is 4 bytes (65536–(2^32–1) units).

For string, unsigned string ("ustring"), and raw field types, lengths are given in the units appropriate to the type (e.g., bytes for string and raw and two-byte code points for ustring). This encoding scheme produces a flag byte of zeros for a zero-length field. The leading and trailing segments consist of the segment length field followed by a repeated unit. The middle segment consists of a length field and the unaltered contents of the segment.

For string, unsigned string ("ustring"), and raw field types, to encode a field the encoding scheme starts at the front of the field and counts leading units with the same value, which provides the length of the leading segment and its repeated unit. This may take care of the entire field. If the length of the leading segment is less than three, the field is treated as if there is no leading segment. Next, the encoding scheme starts at the back of the field and counts trailing units with the same value, which provides the length of the trailing segment and its repeated unit. As with the leading segment, the trailing segment is discarded if its length is less than three. Any units not included in the leading and trailing segments constitute the middle segment. The encoding scheme now knows the length and starting location of each segment, and, therefore, the length of the required output buffer. The encoding scheme obtains the buffer and stores the flag byte and each segment in order.

Dates in date field types are stored as a number of days since from 4713 BCE January 1, 12 hours GMT (the Julian proleptic Calendar). The day count is stored as a 32-bit integer. Since many dates are likely to be in the 20th and 21st century, the day number will typically require 3 significant bytes. The encoding scheme stores the bytes of the value in little-endian order. In certain embodiments, the date offsets may be re-based to a date in the 20th century to reduce the magnitude of the offsets.

Time values in time field types are stored as three separate hour, minute, and second values, as well as, an optional microsecond value. These fields are stored separately internally so extracting them separately is efficient. Each field may be extracted and used to construct a 64-bit unsigned integer, which is encoded using an encoding scheme. Example ranges and number of bits needed for each portion of a time value are illustrated in Table F:

TABLE F

| Portion | Range | Bits |
|---|---|---|
| Hours | 0-23 | 5 |
| Minutes | 0-59 | 6 |
| Seconds | 0-59 | 6 |
| Microseconds | 0-999999 | 20 |
| Total | | 37 |

Since the microsecond portion is optional, and also has the largest variation and therefore chance to have leading zeros that will compress out, the 64-bit value is constructed in this order: Zeros (27 bits), Microseconds (20 bits), Seconds (6 bits), Minutes (6 bits), and Hours (5 bits), A timestamp in a timestamp field type is a composite of date and time values, and the encoding may be a composite of the encoding used for date and time values. If the timestamp does not have a microsecond value, then the date and time portions fit comfortably into the low order 49 bits of a 64-bit unsigned integer: Zeros (15 bits), Date (32 bits), Seconds (6 bits), Minutes (6 bits), and Hours (5 bits).

Since a timestamp may require 37 bits, the range of acceptable date values to may be restricted to 27 bits, checking each date to make sure it does not exceed the available range (i.e., this is a restriction for dates beyond the year 179,020): Date (27 bits), Microseconds (20 bits), Seconds (6 bits), Minutes (6 bits), and Hours (5 bits).

For decimal field types, the encoding scheme copies the bits in and out, with a byte count computed as 1+((precision( )+scale( ))/2). Since leading nibbles may be zero, leading zero nibbles may be compressed out.

In block 506, each precount operator 134 performs precount processing. In certain embodiments, the precount processing includes building a collection of count tables in memory 124, with one count table for each field identifier, keyed by field value. With continued processing, a count is maintained for each distinct field identifier and field value in the count table. In certain embodiments, the count table is a hash table. In certain alternative embodiments, other types of structures may be built (e.g., a B-Tree may be used instead of a hash table).

A hash table may be described as a lookup table of (field value, count), where the field value acts as a key and the count is the number of occurrences of the field value. The field value is "hashed" (i.e., converted to an unsigned integer using a function that produces the same hash value (or "hash") for a given field value). The hash value is taken modulo the size of the hash table (e.g., a prime number) to select a "hash bucket". The field value and associated field identifier are then stored in that hash bucket, typically by chaining each pair to the next pair.

Assuming the hash function produces well-distributed values, and the number of hash buckets is within a small multiple of the number of (field value, count) pairs, a hash table is a fast lookup table.

Some fields may have many distinct field values, with the result that the entire count table does not fit into the available memory 124. When a count table reaches the available memory 124 limit, the contents of the count table are sent via a new dataset whose rows contain the field identifier, field value, and count, to a corresponding sort operator 136. Similarly, when the count in the table may overflow the field (e.g., the field holds five integers (99999), and incrementing the count by one would be too large for the field), a record containing the count for that value is sent to the postcount operator 138, and the count in the count table in memory 124 is reset.

Each precount operator 134 reduces the total number of field identifier/field value records in memory by flushing records as needed. Flushing may be described as clearing memory by sending the records elsewhere (e.g., from the precount operator 134 to the sort operator 136). This technique is especially useful for fields having a few distinct field values. Record A is an example of a record in a count table produced by the precount operator 134, in which "Field" represents the field (e.g., first name), "Field Value" represents the value of the field (e.g., John), and the "Count" represents a number of occurrences of the field value:

| Record A | | |
|---|---|---|
| Field identifier | Field Value | Count |

Logically, the field identifier and field value are viewed as a composite key value, although they may be separate fields in the count table. In certain embodiments, the size of the count field is an unsigned integer of 16 bits (uint16).

FIG. 7 illustrates an example precount operator 700 in accordance with certain embodiments. The precount operator 700 is one example of the precount operator 134. The precount operator 700 builds a hash table for each field in the input dataset and performs a (possibly partial) count summarization on the output of the invert operator 600. The input dataset ("Input 0" in FIG. 7) has the schema produced by the invert operator 600 and is partitioned using a modulo partitioner on the hash of the composite key value. The output dataset ("Output 0" in FIG. 7) contains count summaries for each field value. The precount processing is similar for each record, with some variation possible based on input field type. In particular, the field identifier is extracted from the encoded value ("encodedValue") for a record and is used to select the hash table for the field. If the length of the encoded value is zero, this record represents a null value for the field, and a special null field value count is incremented in the hash table; otherwise, the hash value ("hash") for the encoded value is recovered by subtracting the field identifier from the hash value. That hash value and the encoded value are used to attempt to locate a hash table entry for the field value. If there is no hash table entry for this field value, a hash table entry is created, and the field value count is initialized to one. If there is a hash table entry, the field value count is incremented by one.

If the field value count (e.g., a uint16 value) reaches a maximum representable count (e.g., 65535), an output record is created, encodedValue is set to the composite field identifier/encoded value, and valueCount is set to the field value count. Then the field value count for the field value is reset to zero.

When adding a new field value, if the memory used by the hash table for this field exceeds the memory reserved for the hash table, the hash table is moved to data storage 190 by creating output records for each hash table entry. Then, the hash table in memory is cleared and used again.

A record count record contains a count of the number of input records provided to the invert operator 132 and is used by the summary operator 140 to provide a record count for the input dataset. Records with a field identifier of 0 are records counts, and there is one occurrence of this record, so the record count value and count (i.e., of 1) may be forwarded immediately, and no hash table is needed.

The resulting output dataset contains, in aggregate, field value counts for each field identifier and field value from the input dataset.

Embodiments may utilize a variety of optimizations. For instance, if some number of hash table flushes occur in which all field value counts are one, it may be reasonable to conclude that the field is a key field and contains all unique values, in which case the pre-count processing may be skipped (i.e., embodiments do not attempt to pre-summarize the counts). Similarly, if some number of records are processed and a very small number of distinct field values is observed for a particular field, it may be reasonable to assume that most of the values for that field have been seen, and, therefore the amount of storage reserved for the field's hash table may be reduced.

Type-specific optimizations are also possible. For instance, fields of type int8 and uint8 may only have 256 values, so embodiments may replace the hash table for such fields with a simple array. Embodiments may also cache the first 256 values of other numeric values in a similar manner.

Embodiments may record tuning statistics for the hash tables, including information such as, number of times the hash table was flushed, average count per entry, etc.

In block 508, each sort operator 136 sorts the recently flushed records in data storage 190 produced by the precount operator 134 based on field identifier and value. The sorting makes adjacent the field values for each field in the original record.

In block 510, each postcount operator 138 combines the sorted records with identical field identifier/field value keys (i.e., with identical composite key values) and produces a consolidated count record for each field value. The postcount operators 130 write these count records to output records in the frequency distribution dataset 512. Record B is an example output record of a frequency distribution dataset, including a field value count field, a tagged subrecord containing fields for each field in the original input dataset, and a value field:

| Record B | | |
|---|---|---|
| Field Value Count | Tagged Subrecord | Field Value |

FIG. 8 illustrates an example postcount operator 800 in accordance with certain embodiments. The postcount operator 800 is one example of the postcount operator 138. The postcount operator 800 takes as input ("Input 0" in FIG. 8) the sorted field value count records and combines the values for each distinct field identifier and encoded value combination, producing the final frequency distribution records ("Output 0" in FIG. 8). The postcount operator 800 may also produce summary information ("Output 1" in FIG. 8) for the final summary processing performed by the summary operation 900 (in FIG. 9, which illustrates an example summary operator 900 in accordance with certain embodiments.).

The input records to the postcount operator 800 are the sorted field value count records, with the schema produced by the precount operator 700. The count field is optional, and, if the count field is not present in the input schema, a value of one is assumed for each record. This allows this system of operators to function without the precount operator 800 in certain embodiments.

The output records for the frequency distribution dataset (output dataset 0) contain a field value count and the associated field value, with the various field types represented as a tagged subrecord with an arm for each field in the input record. In addition to the frequency distribution on output zero, the postcount operator 800 produces summary information on output one. The values field is the total number of distinct field values observed for this field (including nulls). The instances field is the number of instances of this field in the input. For non-vector fields (and fields not nested within a vector or tagged subrecord), this count is the same as the number of records in the input dataset. For vector fields, this count depends on the vector lengths of the containing vector. Similarly, the count for fields nested in tagged subrecords depends upon the tag values of the subrecord.

For the per-record processing, the postcount operator 800 maintains several running variables. The fieldNumber variable is the current field identifier (initially zero). The value variable is the current value for the field. The count variable is the total number of times a particular value occurred for the field (initially zero). The values variable is he number of distinct field values seen for this field (initially zero). The instances variable is the number of instances of the field (initially zero), and this is the sum of the counts of each value. The tagNumber variable is the tag number in the output dataset that corresponds to this field. The fieldDecoder variable is a pointer to the function needed to turn an encoded field value back into the actual field value.

These variables are written to the output datasets when processing is complete for a value within a field and when processing is complete for a field.

The postcount operator 800 uses several routines provided by embodiments. A valueComplete routine sets an output tag as appropriate for the field (from tagNumber), sets a value (using fieldDecoder) and count in the output record, and writes the record to output dataset zero, which is a frequency distribution dataset. A fieldComplete routine sets a fieldNumber, values and instances in the output record and writes the record to output dataset one, which is an intermediate dataset that is processed by the summary operator. A newValue routine sets a value from the incoming record and set count to zero and adds one to values. A newField routine sets field-Number, tagNumber and fieldDecoder from the incoming record and sets values and instances to zero. A processValue routine adds the incoming count to count and instances.

For the per-record processing, if a field identifier differs from field identifier of the previous record, a new field is being started. Unless this is the first record, the postcount operator 800 calls the valueComplete and fieldComplete routines. Then, the postcount operator 800 calls the newField, newValue and processValue routines and goes on to the next record. If the value differs from value of the previous field, a new value is being started for the current field. The postcount operator 800 calls the valueComplete and processValue routines and then goes on to the next record. Otherwise, this is a new count for the current value, and the postcount operator 800 calls the processValue routine. When all records have been processed, the postcount operator 800 calls the valueComplete and fieldComplete routine and then terminates.

The postcount operator 800 also processes special record count values. These are distinguished by a field identifier of zero, and the record count then follows as a 64-bit, little-endian unsigned number. The output record for these values is tag 0, the f_0 field, and both the count and f_0 values are set to the record count.

In block 514, the summary operator 140 summarizes the frequency distribution data. The processing of block 514 is optional. The summary operator 140 produces a summary record for each field, containing the field identifier, the number of instances of the field, and the number of distinct field values that occurred in that field. Record C is an example of a summary record, in which "Field Identifier" identifies a field, "Number of Field Instances" indicates a number of instances of that field, and "Number of Distinct Field Values" indicates the number of different values that have been found for the field:

| Record C | | |
|---|---|---|
| Filed Identifier | Number of Field Instances | Number of Distinct Field Values |

In a sequential process, the summary operator 140 combines the summary records for each field and produces a final field summary dataset 516. Record D is an example of a field summary dataset in which "Field Identifier" identifies a field, "Field Name" is the name of the field, "Field Type" is a type of the field (e.g., uint or string), "Number of Field Instances" indicates a number of instances of that field, and "Number of Distinct Field Values" indicates the number of different values that have been found for the field:

| Record D | | | | |
|---|---|---|---|---|
| Field Identifier | Field Name | Field Type | Number of Field Instances | Number of Distinct Field Values |

Blocks 500-516 may be said to represent the frequency distribution operator 130 processing and input/output data.

FIG. 9 illustrates an example summary operator 900 in accordance with certain embodiments. The summary operator 900 is one example of the summary operator 140. The summary operator 900 is a sequential operator that combines the field summary records ("Input 0" in FIG. 9) produced by partitions of the postcount operator 800 and produces a summary dataset ("Output 0" in FIG. 9) containing per-field summary information.

In block 518, the extract operator 170 extracts one or more frequency distribution for one or more fields from the large, consolidated frequency distribution dataset 512. The processing of block 518 is optional. This process takes the frequency distribution dataset 512 as input and produces an output dataset for each extracted field. Record E is an example of an output dataset for an extracted field, in which "Value" represents a field value, "Count" represents a number of occurrences of that field value, and "Percentage" is an optional field that indicates the percentage of total field instances that had this particular field value:

| Record E | | |
|---|---|---|
| Field Value | Count | Percentage (Optional) |

In certain embodiments, the percentage is produced if the field summary dataset is identified when the extract operator 138 is invoked, which provides the field instance count used for the percentage calculation. If requested, the extract 170 operator also produces a copy of the input frequency distribution, but with the data for the extracted fields removed.

FIG. 10 illustrates an example extract operator 1000 in accordance with certain embodiments. The extract operator 300 is one example of the extract operator 170. The extract operator 1000 may have either one or two inputs: "Input 0" is a frequency distribution dataset and optional "Input 1" is a corresponding summary dataset. If the field summary dataset is attached, then a percentage field is produced in the extracted frequency distributions. The extract operator 1000 is parameterized with the field identifiers of the fields to be extracted. The output datasets are the frequency distributions for the specified fields, in the order that the field identifiers appear on the command line, and, optionally, a copy of the input frequency distribution, with the data for the extracted fields removed. In FIG. 10, "Output 0" and "Output N" describe the output datasets.

Figure 11:
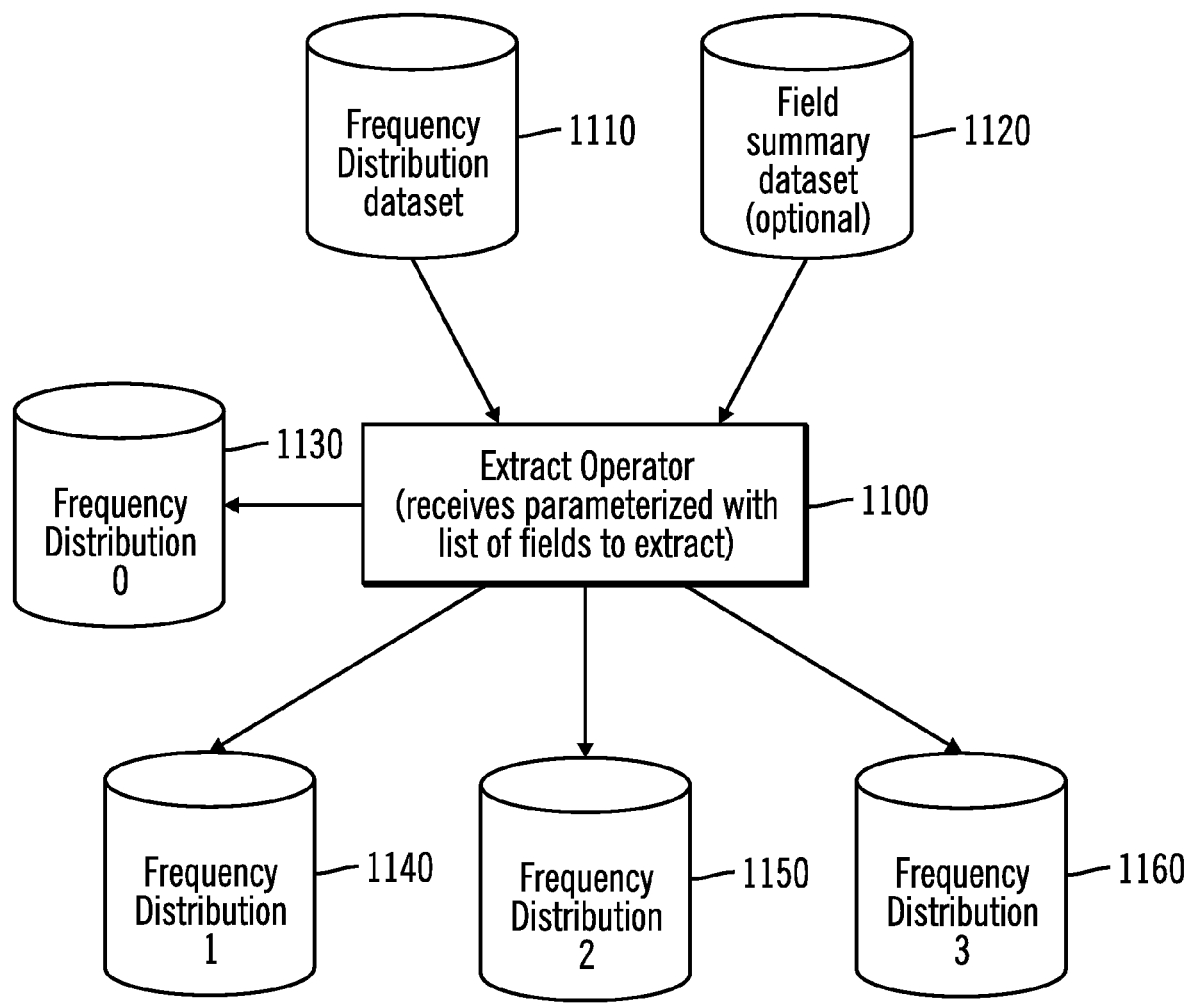
FIG. 11 illustrates extracted datasets in accordance with certain embodiments.

FIG. 11 illustrates extracted datasets in accordance with certain embodiments. In FIG. 11, the extract operator 1100 receives a parameterized list of fields to extract. The extract operator 1100 receives as input data from a frequency distribution dataset 1110 and, optionally, a field summary dataset 1120. The extract operator 1100 outputs datasets, such as frequency distribution 0 1130, frequency distribution 1 1140, frequency distribution 2 1150, and frequency distribution 3 1160.

Figure 12:
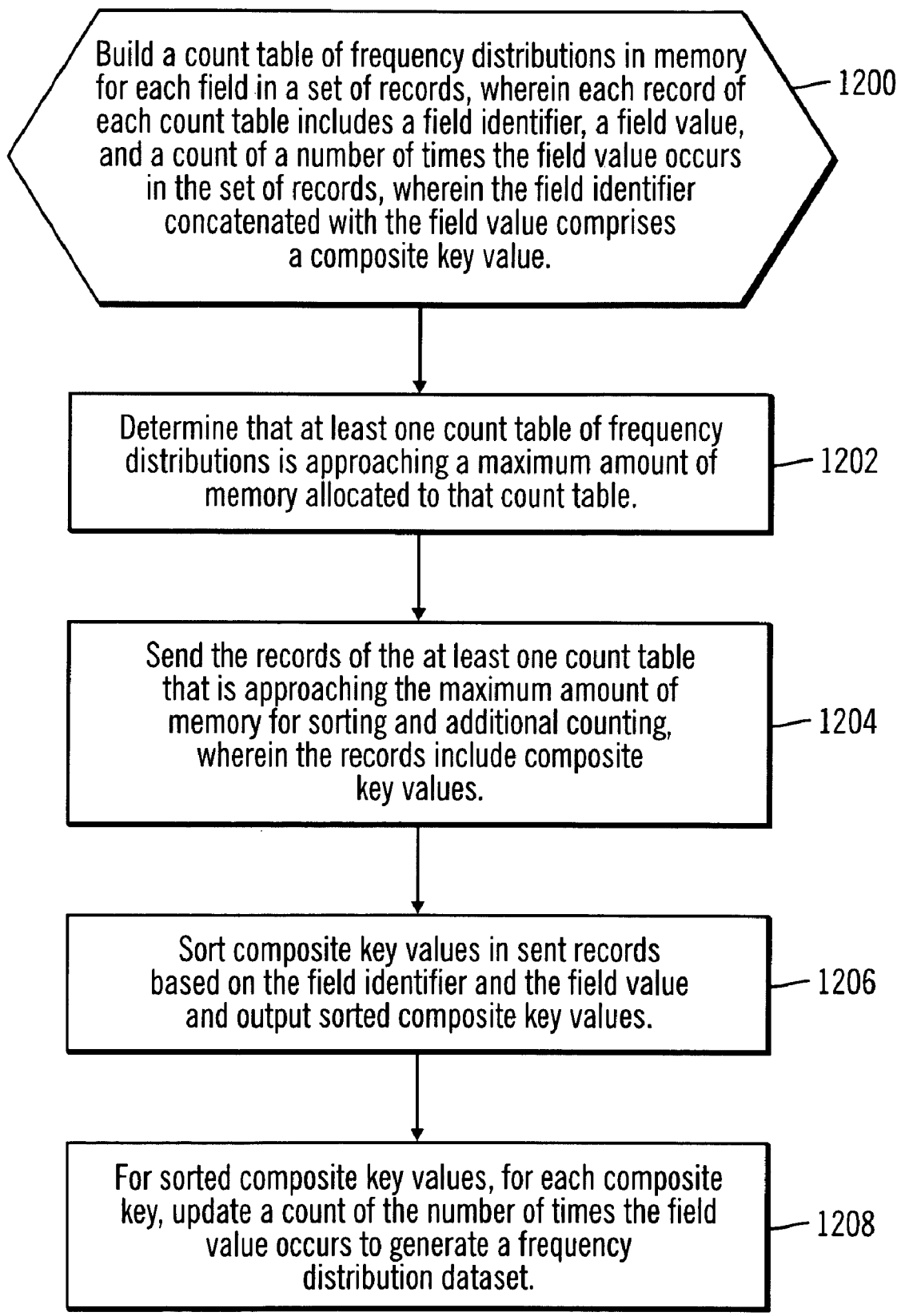
FIG. 12 illustrates logic performed to process records in a two-phase approach in accordance with certain embodiments.

FIG. 12 illustrates logic performed to process records in a two-phase approach in accordance with certain embodiments. Control begins at block 1200 with a count table of frequency distributions being built in memory for each field in the set of records, wherein each record of each count table includes a field identifier, a field value, and a count of a number of times the field value occurs in the set of records, wherein the field identifier concatenated with the field value comprises a composite key value. In block 1202, it is determined that at least one count table of frequency distributions is approaching a maximum amount of memory allocated to that count table. In block 1204, the records of the at least one count table that is approaching the maximum amount of memory is sent for sorting and additional counting, wherein the records include composite key values.

Figure 13:
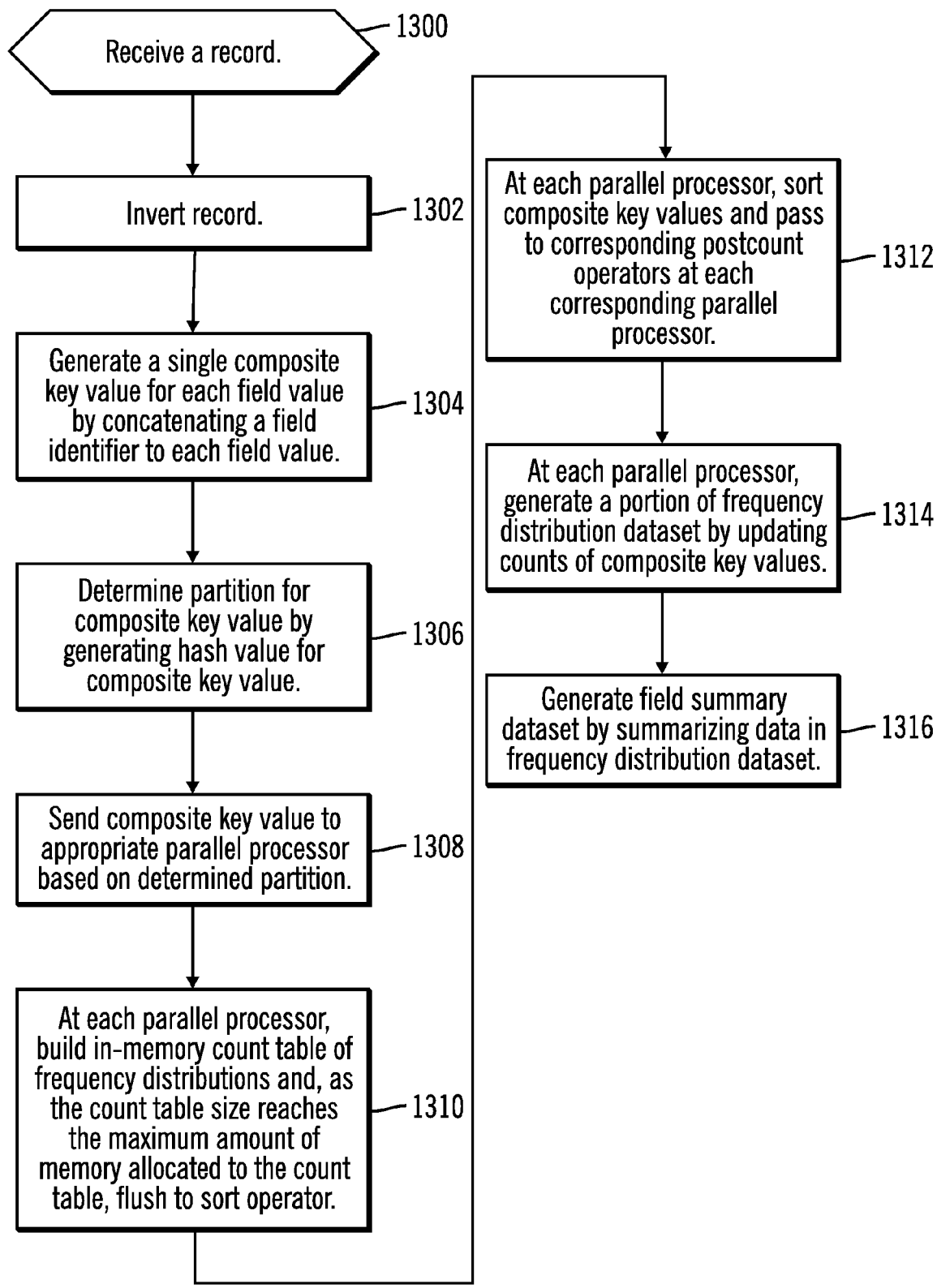
FIG. 13 illustrates logic performed by a frequency distribution operator in accordance with certain embodiments.

In block 1206, the composite key values in the sent records are sorted based on the field identifier and the field value sorted composite key values are output. In block 1208, for the sorted composite key values, for each composite key, a count of the number of times the field value occurs is updated to generate a frequency distribution dataset. In this manner, both the a "table in memory" approach and a "sort and count" approach are combined. FIG. 13 illustrates logic performed by the frequency distribution operator 130 in accordance with certain embodiments. Control begins at block 1000 with each invert operator 132 receiving a record. In block 1302, each invert operator 132 inverts the record. In block 1304, each invert operator 132 generates a single composite key value for each field value by concatenating a field identifier to each field value. In block 1306, each invert operator 132 determines a partition for the composite key value by generating a hash value for the composite key value. In block 1308, each invert operator 132 sends the composite key value to an appropriate parallel processor 150 based on the determined partition. One or more partitions may be associated with each parallel processor 150.

In block 1310, each precount operator 134 builds an in-memory count table of frequency distributions and, as the count table size reaches the maximum amount of memory allocated to the count table, flushes the count table to a corresponding sort operator 136. In block 1312, each sort operator 136 at each parallel processor 150 sorts the composite key values and passes these to corresponding postcount operators 138 at each corresponding parallel processor 150. In block 1314, each postcount operator 138 at each parallel processor 150 generates a portion of a frequency distribution dataset by updating counts of composite key values. In block 1316, a summary operator 140 generates a field summary dataset by summarizing data in the frequency distribution dataset.

Embodiments provide a two-phase approach to determining a frequency distribution with a "table in memory" phase followed by a "sort and count" phase. These phases are self-tuning in that the frequency distribution is mostly computed using the "table in memory" approach if the number of distinct field values is small, but, if the number of distinct field values is large, the "sort and count" approach is used to do the bulk of the work.

Embodiments also compute a frequency distribution on multiple fields at once by inverting the fields and adding a field identifier to each field value to form a composite key value. Embodiments may exploit parallel hardware by partitioning the inverted composite key value stream on the composite key value, so that each partition contains a unique subset of the composite key values. Thus, embodiments work with parallel input data and produce a parallel result.

Also, the two-stage count generation process enables the frequency distribution operator to operate without "hints" from the user regarding the likely number of distinct field values for each field. The size of the count field produced by the precount operator 134 reflects this trade-off: for fields with many values, the size of the count field should be small, and for fields with only a few values, the size of the count field should be large. Thus, the frequency distribution dataset is generated without a priori knowledge of a number of distinct field values for each field identifier.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or any combination of these.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 5, 12, and 13 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 5, 12, and 13 may be implemented in software, hardware, programmable and non-programmable gate array logic or in some combination of hardware, software, or gate array logic.

Figure 14:
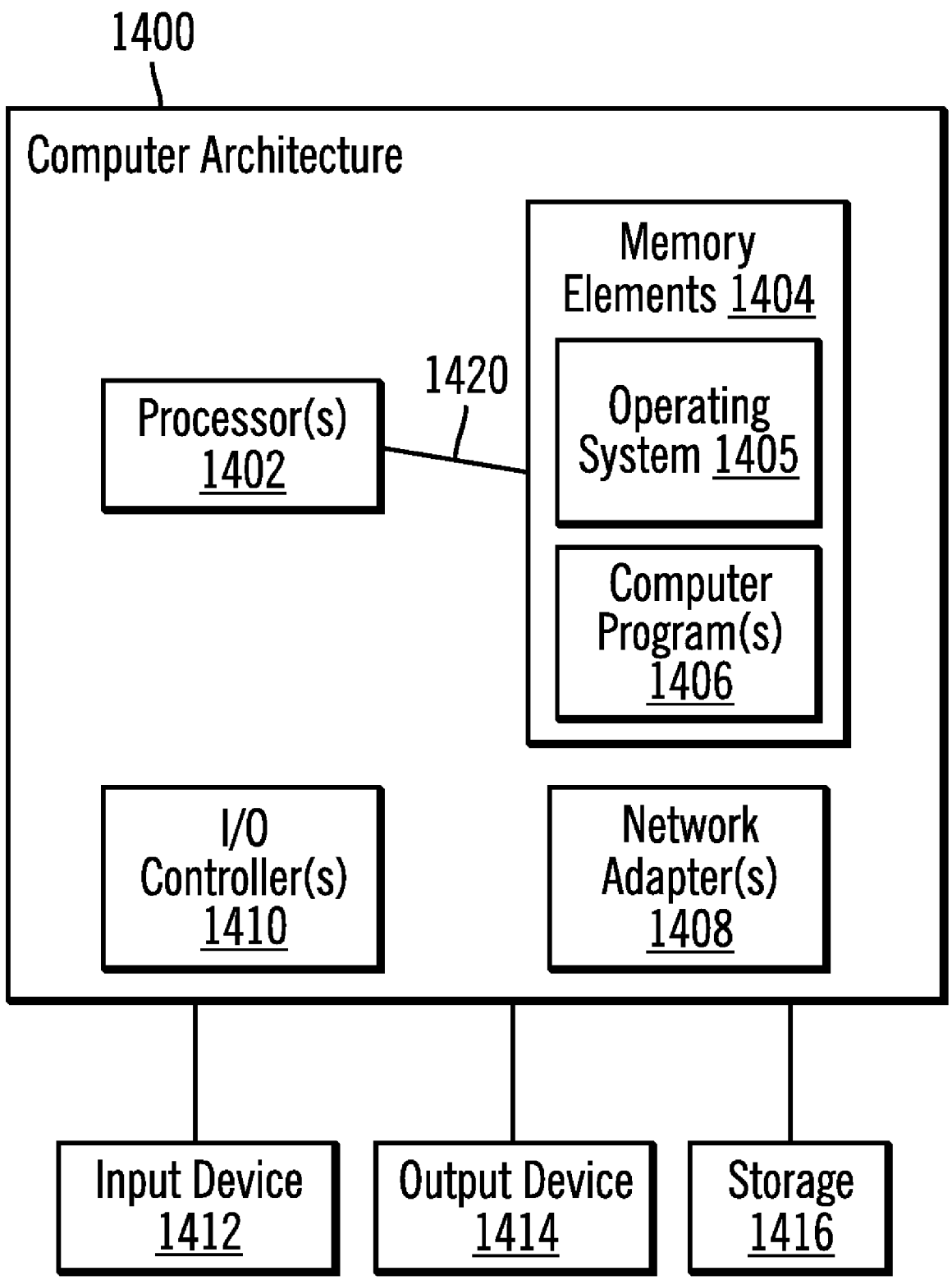
FIG. 14 illustrates an architecture of a computer system that may be used in accordance with certain embodiments.

FIG. 14 illustrates a system architecture 1400 that may be used in accordance with certain embodiments. Computing device 120 (of FIG. 1) may implement system architecture 1400. The system architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The system architecture 1400 may be coupled to storage 1416 (e.g., a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The system architecture 1400 may include fewer components than illustrated, additional components not illustrated herein, or some combination of the components illustrated and additional components. The system architecture 1400 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for determining a frequency distribution for a set of records, comprising:
   inverting a record from the set of records to form field identifier and field value records;
   generating a composite key value for a field identifier and field value record by concatenating the field identifier to the field value;
   determining a partition for the composite key value by generating a hash value for the composite key value;
   sending the composite key value to a parallel processor based on the partition;
   at the parallel processor, building a count table of frequency distributions in memory for each field in the set of records, wherein each record of each count table includes a field identifier, a field value, and a count of a number of times the field value occurs in the set of records, and wherein the field identifier concatenated with the field value comprises a composite key value;
   determining that at least one count table of frequency distributions is approaching a maximum amount of memory allocated to that count table; and
   sending the records of the at least one count table that is approaching the maximum amount of memory for sorting and additional counting, wherein the records include composite key values.

2. The method of claim 1, further comprising:
   sorting the composite key values in the sent records based on the field identifier and the field value; and
   outputting sorted composite key values.

3. The method of claim 2, further comprising:
   for the sorted composite key values, for each composite key, updating a count of the number of times the field value occurs to generate a frequency distribution dataset.

4. The method of claim 3, wherein the building, the determining, the sending, the sorting, and the updating is performed in parallel.

5. The method of claim 3, wherein the frequency distribution dataset is generated without a priori knowledge of a number of distinct field values for each field identifier.

6. The method of claim 1, further comprising:
   generating a field summary dataset based on a frequency distribution dataset.

7. The method of claim 1, further comprising:
   extracting a field from a frequency distribution dataset; and
   creating a new frequency distribution dataset.

* * * * *